(12) United States Patent
Fujisawa

(10) Patent No.: US 7,953,289 B2
(45) Date of Patent: May 31, 2011

(54) IMAGE PROCESSING APPARATUS, DISPLAY DEVICE, AND IMAGE PROCESSING METHOD

(75) Inventor: Tatsuro Fujisawa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/765,591

(22) Filed: Apr. 22, 2010

(65) Prior Publication Data

US 2011/0069883 A1  Mar. 24, 2011

(30) Foreign Application Priority Data

Sep. 18, 2009 (JP) ................. 2009-217806

(51) Int. Cl.
*G06K 9/40* (2006.01)
*G06K 9/00* (2006.01)
(52) U.S. Cl. ........................ 382/266; 382/168
(58) Field of Classification Search .......... 382/168, 382/263, 266–269
See application file for complete search history.

(56) References Cited

U.S. PATENT DOCUMENTS

| 5,892,592 | A | 4/1999 | Adachi et al. |
| 6,987,886 | B1 | 1/2006 | Okubo et al. |
| 2006/0078220 | A1 | 4/2006 | Okubo et al. |
| 2010/0232697 | A1* | 9/2010 | Mishima et al. ............ 382/168 |

FOREIGN PATENT DOCUMENTS

| JP | H07-023227 | 1/1995 |
| JP | 08-125857 | 5/1996 |
| JP | 2001-251517 | 9/2001 |
| JP | 2008-153812 | 7/2008 |

* cited by examiner

*Primary Examiner* — Aaron W Carter
(74) *Attorney, Agent, or Firm* — Blakely, Sokoloff, Taylor & Zafman LLP

(57) ABSTRACT

According to one embodiment, an image processing apparatus includes a storage module, a calculator, a converter, and a filter. The storage module stores a filter coefficient corresponding to a first feature value indicating an image structure of a first pixel block of a predetermined size comprising a plurality of pixels. The calculator calculates a second feature value indicating an image structure of a second pixel block comprising a target pixel to be processed and pixels surrounding the target pixel in an input image. The second pixel block is larger than the first pixel block. The converter converts the second feature value to the first feature value indicating the image structure corresponding to the first pixel block with the target pixel at the center. The filter performs filtering on the first pixel block with the target pixel at the center using the filter coefficient.

7 Claims, 9 Drawing Sheets

IMAGE PROCESSING APPARATUS, DISPLAY DEVICE, AND IMAGE PROCESSING METHOD

CROSS-REFERENCE TO RELATED APPLICATIONS

This application is based upon and claims the benefit of priority from Japanese Patent Application No. 2009-217806, filed Sep. 18, 2009, the entire contents of which are incorporated herein by reference.

BACKGROUND

1. Field

One embodiment of the invention relates to an image processing apparatus, a display device, and an image processing method.

2. Description of the Related Art

Filtering has been performed with an edge-preserving smoothing filter as image processing to remove noise, such as mosquito noise and block noise, from an image. For example, Japanese Patent Application Publication (KOKAI) No. H7-23227 discloses conventional filtering. In the conventional filtering, it is determined that each pixel block formed of a pixel to be processed and surrounding pixels contains an edge. A pixel block is selected from which noise is to be removed and noise removal is performed.

The conventional filtering is capable of identifying only local characteristics if the pixel block is small. That is, the size of the pixel block substantially affects filter performance. In proportion to the size of the pixel block, stored filter coefficients and operations such as the multiplication of the filter coefficients increase. Accordingly, the conventional filtering is not capable of increasing the filter performance while suppressing an increase in operations and stored data related to the filtering.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
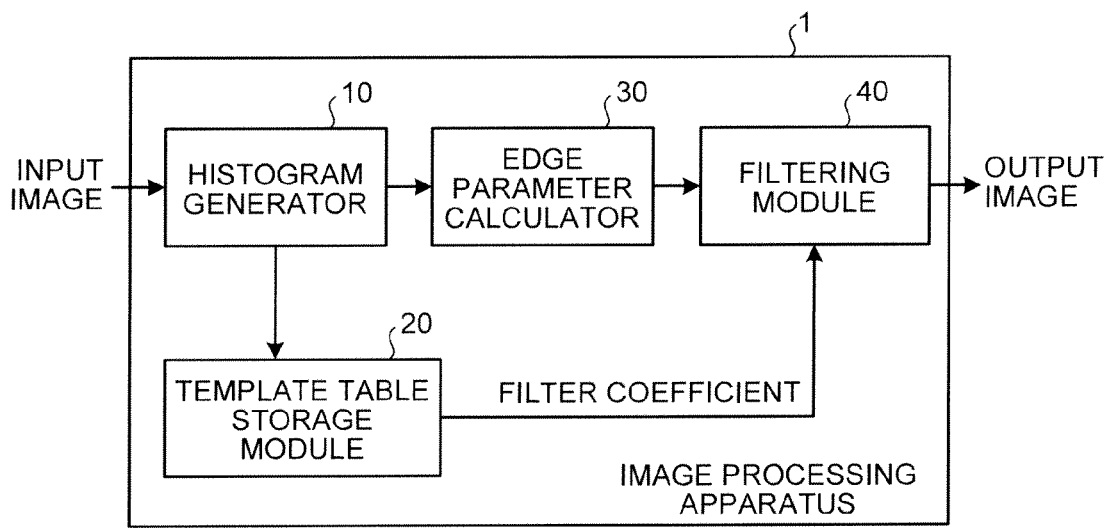
FIG. 1 is an exemplary functional block diagram of an image processing apparatus according to an embodiment of the invention.

Various embodiments according to the invention will be described hereinafter with reference to the accompanying drawings. In general, according to one embodiment of the invention, an image processing apparatus comprises a storage module, a calculator, a converter, and a filter. The storage module is configured to store a filter coefficient corresponding to a first feature value indicating an image structure of a first pixel block of a predetermined size comprising a plurality of pixels. The calculator is configured to calculate a second feature value indicating an image structure of a second pixel block comprising a target pixel to be processed and pixels surrounding the target pixel in an input image. The second pixel block is larger than the first pixel block. The converter is configured to convert the second feature value to the first feature value indicating the image structure corresponding to the first pixel block with the target pixel at the center. The filter is configured to perform filtering on the first pixel block with the target pixel at the center using the filter coefficient.

According to another embodiment of the invention, a display device comprises a storage module, a calculator, a converter, a filter, and a display module. The storage module is configured to store a filter coefficient corresponding to a first feature value indicating an image structure of a first pixel block of a predetermined size comprising a plurality of pixels. The calculator is configured to calculate a second feature value indicating an image structure of a second pixel block comprising a target pixel to be processed and pixels surrounding the target pixel in an input image. The second pixel block is larger than the first pixel block. The converter is configured to convert the second feature value to the first feature value indicating the image structure corresponding to the first pixel block with the target pixel at the center. The filter is configured to perform filtering on the first pixel block with the target pixel at the center using the filter coefficient and output an output image obtained by filtering the input image. The display module is configured to display the output image.

According to still another embodiment of the invention, there is provided an image processing method applied to an image processing apparatus comprising a storage module configured to store a filter coefficient corresponding to a first feature value indicating an image structure of a first pixel block of a predetermined size comprising a plurality of pixels. The information processing method comprises: a calculator calculating a second feature value indicating an image structure of a second pixel block comprising a target pixel to be processed and pixels surrounding the target pixel in an input image, the second pixel block being larger than the first pixel block; a converter converting the second feature value to the first feature value indicating the image structure corresponding to the first pixel block with the target pixel at the center; and a filter performing filtering on the first pixel block with the target pixel at the center using the filter coefficient.

FIG. 1 is a functional block diagram of an image processing apparatus 1 according to an embodiment of the invention.

As illustrated in FIG. 1, the image processing apparatus 1 comprises a histogram generator 10, a template table storage module 20, an edge parameter calculator 30, and a filtering module 40. The image processing apparatus 1 performs noise removal filtering on an input image such as a video and a still image by the filtering module 40, and outputs the image from which noise has been removed.

In the noise removal of the embodiment, a separate histogram for each direction (hereinafter, "orientation histogram") related to a pixel gradient (a differential value of pixels) in a pixel block is used as a feature value of the pixel block. As illustrated in FIG. 1, the histogram generator 10 generates an orientation histogram of a pixel block of a predetermined size including a pixel to be filtered and surrounding pixels neighboring the pixel in an input image. That is, the histogram generator 10 obtains a feature value indicating the image structure of the pixel block.

The template table storage module 20 stores in advance a template table (a lookup table) that stores filter coefficients corresponding to various forms of the orientation histogram. More specifically, the template table storage module 20 stores filter coefficients each corresponding to an orientation histogram as a feature value indicating the image structure of a pixel block in units of pixel blocks of a predetermined size (first pixel block, which will be described later) formed of a plurality of pixels. The template table storage module 20 refers to the template table and outputs a filter coefficient corresponding to an orientation histogram generated for each pixel block by the histogram generator 10 to the filtering module 40.

The filter coefficient stored in the template table storage module 20 may be generated, for example, by obtaining a regression curve (curved surface model) fitted to a plurality of pixels (kernel) with a pixel to be filtered as a center pixel (H. Takeda, S. Farsiu, and P. Milanfar "Kernel Regression for Image Processing and Reconstruction", IEEE Trans. Image Proc., Vol. 16, No. 2, pp. 349-366, 2007). By generating a filter coefficient equivalent to the regression curve fitting and associating the filter coefficient with an orientation histogram, it is possible to implement filtering achieving both sharpness and noise removal.

The edge parameter calculator 30 calculates an edge parameter indicating the direction, intensity, and sharpness of an edge contained in each pixel block. The filtering module 40 performs filtering on an input image and outputs the image from which noise has been removed. More specifically, based on a filter coefficient from the template table storage module 20 and an edge parameter calculated by the edge parameter calculator 30, the filtering module 40 performs convolution operation using the filter coefficient with respect to each pixel block.

Figure 2:
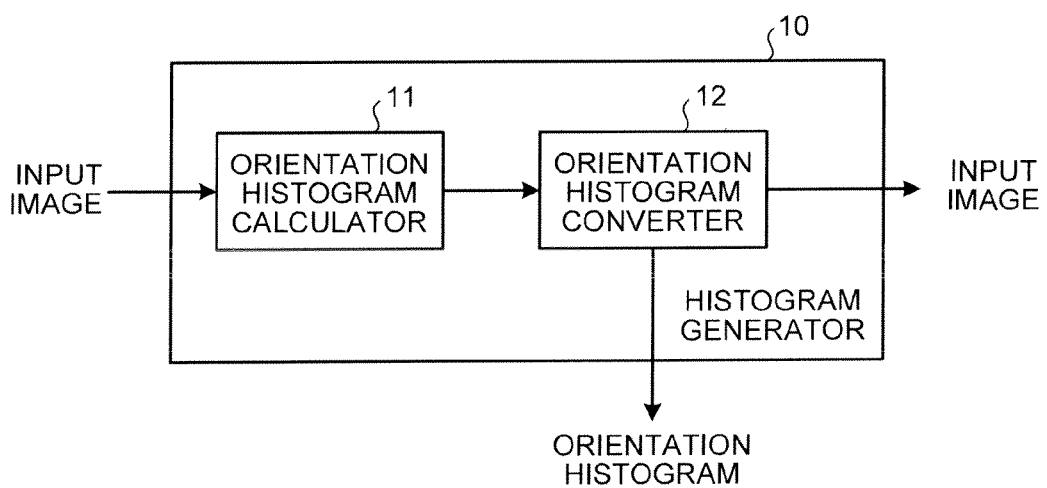
FIG. 2 is an exemplary functional block diagram of a histogram generator in the embodiment.

The histogram generator 10 will now be described in detail. FIG. 2 is a functional block diagram of the histogram generator 10. As illustrated in FIG. 2, the histogram generator 10 comprises an orientation histogram calculator 11 and an orientation histogram converter 12.

The orientation histogram calculator 11 calculates an orientation histogram of a pixel block (second pixel block) larger than a pixel block (first pixel block) to be filtered using a filter coefficient. The orientation histogram converter 12 converts (normalizes) the orientation histogram calculated for the second pixel block to an orientation histogram corresponding to the first pixel block.

Figure 3:
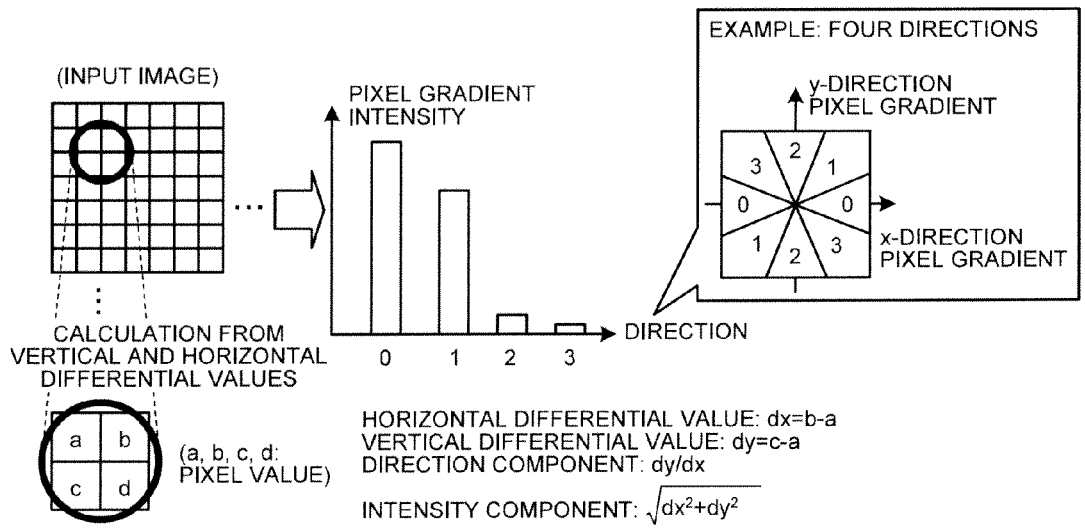
FIG. 3 is an exemplary schematic diagram for explaining the calculation of an orientation histogram in the embodiment.
Figure 4:
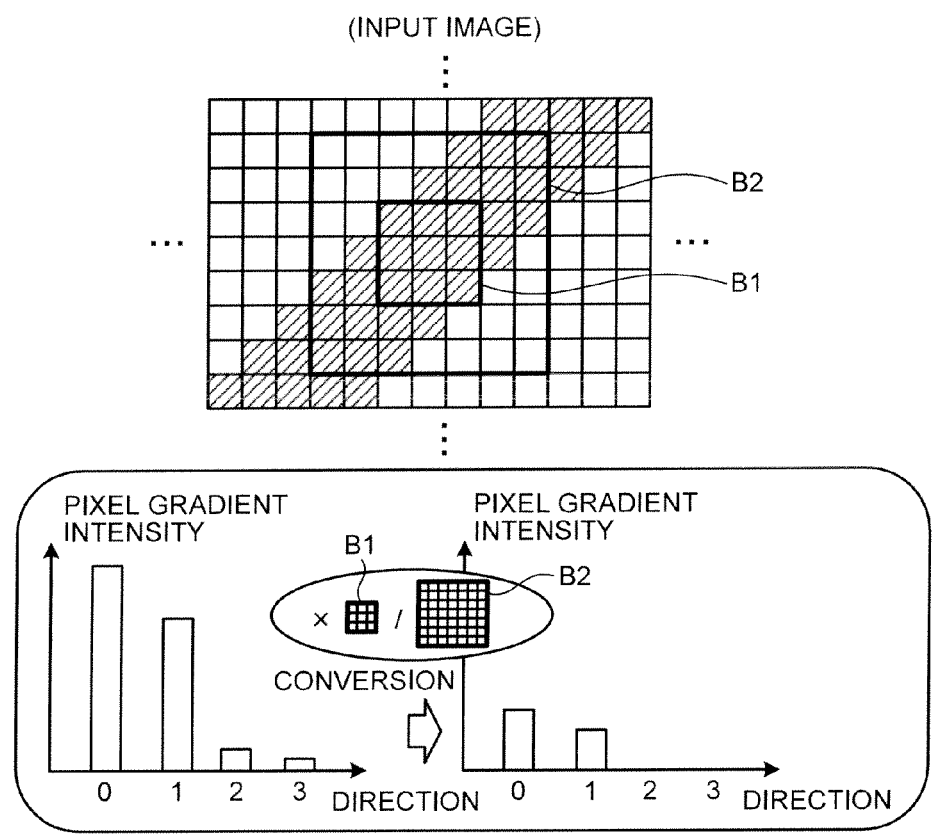
FIG. 4 is an exemplary schematic diagram for explaining the conversion of the orientation histogram in the embodiment.

FIG. 3 illustrates an example of the calculation of an orientation histogram. FIG. 4 illustrates an example of the conversion of the orientation histogram. As illustrated in FIG. 3, the orientation histogram calculator 11 calculates a direction component and an intensity component from vertical and horizontal differential values of pixels contained in a pixel block. Then, based on the direction component and the intensity component, the orientation histogram calculator 11 calculates an orientation histogram for, for example, each of four directions 0 to 3. In this manner, the orientation histogram calculator 11 calculates the orientation histogram of a second pixel block.

As illustrated in FIG. 4, a second pixel block B2 is larger than a first pixel block B1 to be filtered using a filter coefficient. Therefore, image characteristics can be identified in a wider range in the second pixel block B2 than in the first pixel block B1. However, since the filter coefficient corresponds to the orientation histogram of the first pixel block B1, the orientation histogram or the second pixel block B2 cannot be used as it is and needs to be converted to an orientation histogram corresponding to the first pixel block B1. The orientation histogram converter 12 converts the orientation histogram of the second pixel block B2 to an orientation histogram corresponding to the first pixel block B1 based on the ratio of areas between the first pixel block B1 and the second pixel block B2. For example, the first pixel block B1 is formed of 3×3 pixels, and the second pixel block B2 is formed of 7×7 pixels, the orientation histogram converter 12 multiplies the orientation histogram of the second pixel block B2 by 9/49 to convert it to an orientation histogram corresponding to the first pixel block B1.

Figure 5:
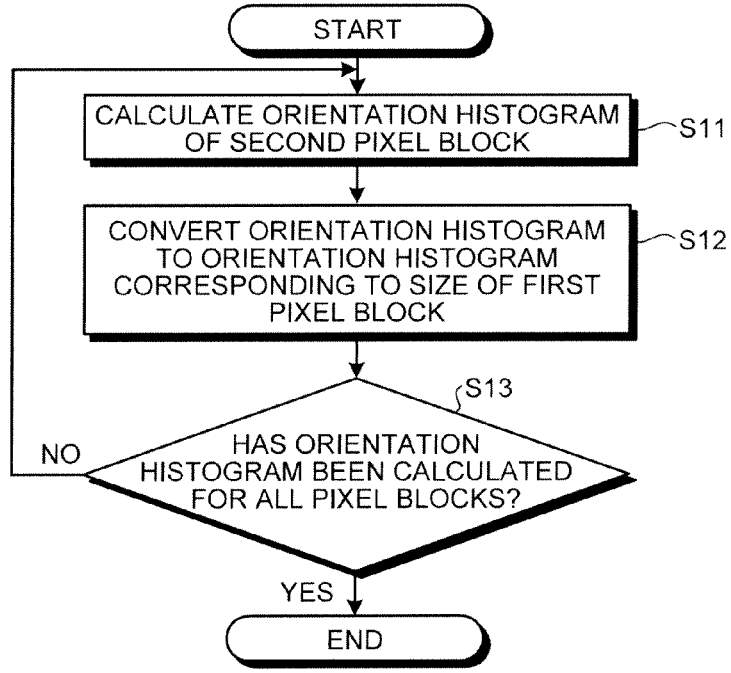
FIG. 5 is an exemplary flowchart of the operation of the histogram generator in the embodiment.

FIG. 5 is a flowchart of the operation of the histogram generator 10. As illustrated in FIG. 5, the orientation histogram calculator 11 calculates an orientation histogram of the second pixel block (S11). Then, the orientation histogram converter 12 converts the orientation histogram calculated by the orientation histogram calculator 11 to an orientation histogram corresponding to the size of the first pixel block (S12).

Thereafter, the histogram generator 10 determines whether an orientation histogram is calculated for all pixel blocks of pixels of an input image (S13). When an orientation histogram has been calculated for all the pixel blocks (Yes at S13), the process ends. On the other hand, when an orientation histogram has not yet been calculated for all the pixel blocks (No at S13), the process returns to S11 to calculate an orientation histogram of a pixel block for which an orientation histogram has not yet been calculated.

Figure 6:
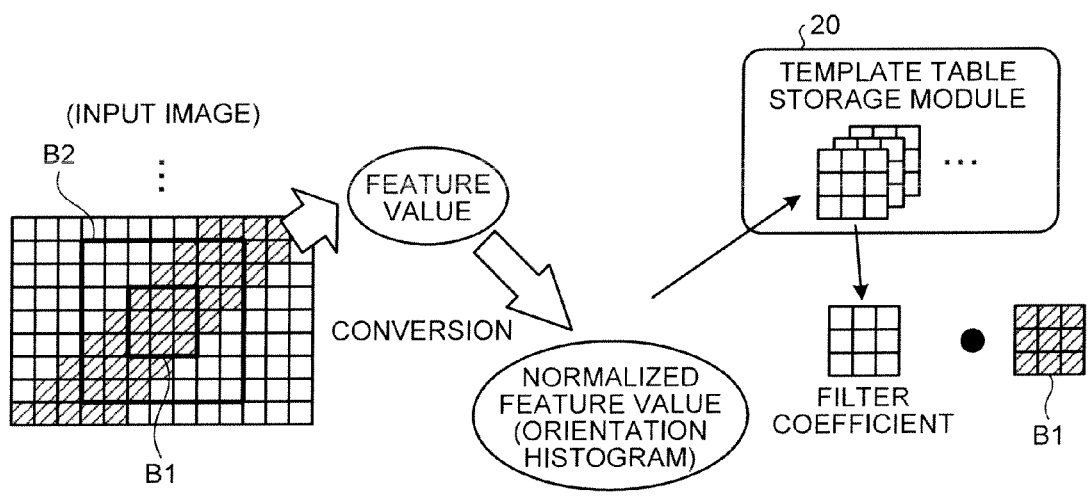
FIG. 6 is an exemplary schematic diagram for explaining filtering using a filter coefficient from the converted orientation histogram in the embodiment.

FIG. 6 illustrates an example of filtering using a filter coefficient from a converted orientation histogram. As illustrated in FIG. 6, the histogram generator 10 calculates an orientation histogram (a feature value) of the second pixel block B2 larger than the first pixel block B1 to be filtered using a filter coefficient. The histogram generator 10 converts (normalizes) the orientation histogram of the second pixel block to an orientation histogram corresponding to the first pixel block B1 based on the ratio of areas between the first pixel block B1 and the second pixel block B2 and the like.

Generally, as the pixel block to be filtered using a filter coefficient is smaller, the template table stored in the template table storage module 20 can be smaller and the convolution operation can be reduced at the time of filtering. However, as the pixel block is smaller, only local characteristics can be identified in an input image. For example, if an edge boundary overlaps the boundary between pixel blocks, the edge shape cannot be accurately determined in a small pixel block and an appropriate filter coefficient cannot be selected. As a result, when a pixel block is small, the quality of an output image after filtering degrades.

The histogram generator 10 identifies characteristics of an input image in the second pixel block B2 larger than the first pixel block B1. Accordingly, the histogram generator 10 is capable of generating an orientation histogram indicating the characteristics accurately and thereby increasing the filter performance. Besides, the histogram generator 10 converts an orientation histogram calculated for the second pixel block B2 into an orientation histogram corresponding to the first pixel block B1. This prevents an increase in the required memory capacity of the template table storage module 20 and the operation amount at the time of filtering.

If the first pixel block B1 has n pixels both vertically and horizontally from the center pixel and is in a size of $(2n+1) \times (2n+1)$ pixels, the second pixel block B2 may have 2n pixels both vertically and horizontally from the center pixel and be in a size of $(4n+1) \times (4n+1)$ pixels (n: a natural number not including 0). When the first pixel block B1 and the second pixel block B2 satisfy such a relationship, by increasing the value of n, the ratio of areas between the first pixel block B1 and the second pixel block B2 can be approximated to 1:4. This facilitates the normalization operation.

Further, if the first pixel block has n pixels both vertically and horizontally from the center pixel and is in a size of $(2n+1) \times (2n+1)$ pixels, the second pixel block B2 may be in a size of $8m \times 8m$ pixels (n, m: both natural numbers satisfying the relationship $2n+1 < 8m$). When the first pixel block B1 and the second pixel block B2 satisfy such a relationship, a central processing unit (CPU), a digital signal processor (DSP), and the like that handle data in multiples of 8 bits can efficiently calculate an orientation histogram.

Figure 7:
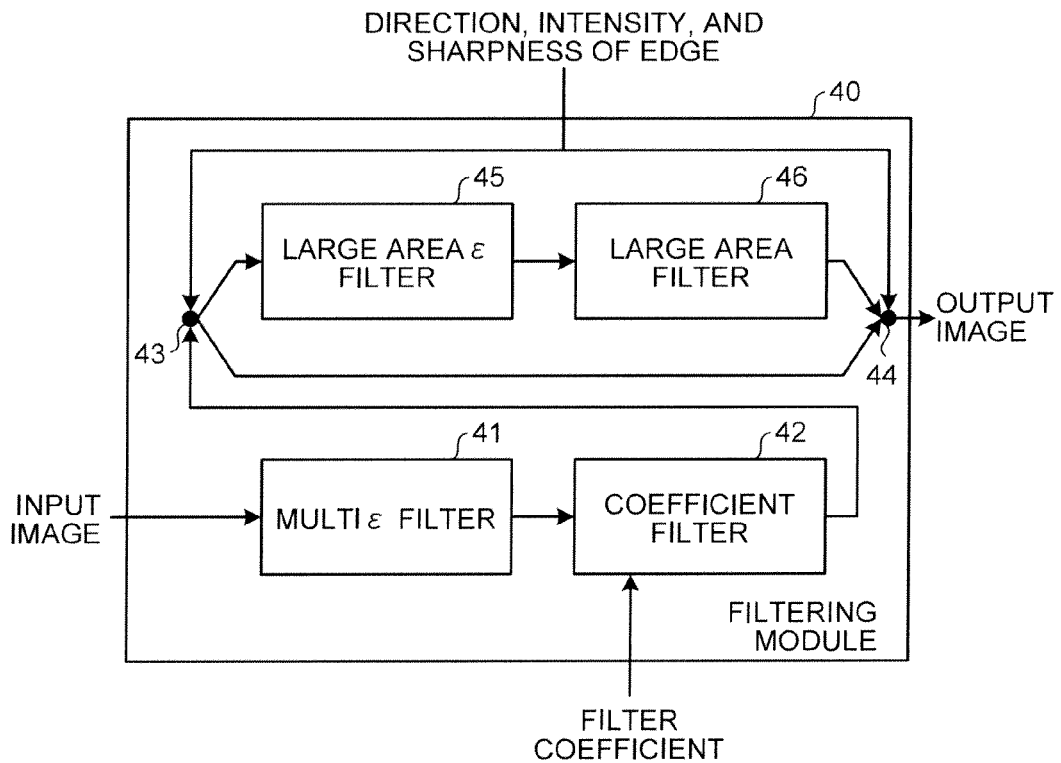
FIG. 7 is an exemplary functional block diagram of a filtering module in the embodiment.

The filtering module 40 will be described in detail below. FIG. 7 is a functional block diagram of the filtering module 40. As illustrated in FIG. 7, the filtering module 40 comprises a multi $\epsilon$ filter 41, a coefficient filter 42, switches 43 and 44, a large area $\epsilon$ filter 45, and a large area filter 46.

The multi $\epsilon$ filter 41 performs $\epsilon$ filtering using multiple thresholds $\epsilon$ (hereinafter, "multi $\epsilon$ filtering") with respect to each pixel block (first pixel block) to be filtered of a pixel in an input image. In the $\epsilon$ filtering, the multi $\epsilon$ filter 41 compares an absolute difference between a pixel to be processed (center pixel) and each surrounding pixel in a pixel block with the threshold $\epsilon$, and replaces the pixel value of a surrounding pixel with an absolute difference exceeding the threshold $\epsilon$ by that of the center pixel. By the multi $\epsilon$ filtering using multiple thresholds $\epsilon$, the multi $\epsilon$ filter 41 performs such replacement of pixel values in stages.

Figure 8:
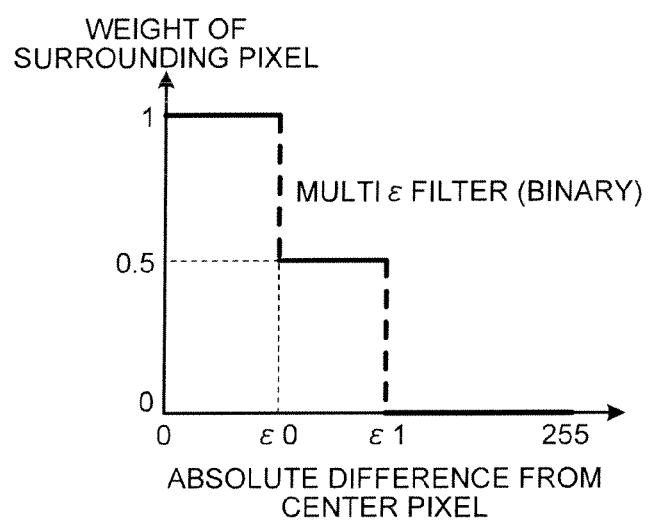
FIG. 8 is an exemplary schematic diagram for explaining the relationship between an absolute difference from a center pixel and the weight of a surrounding pixel in a multi $\epsilon$ filter (binary) in the embodiment.

FIG. 8 illustrates an example of the relationship between an absolute difference from the center pixel and the weight of a surrounding pixel in a multi $\epsilon$ filter (binary). As illustrated in FIG. 8, when the multi $\epsilon$ filtering is performed with, for example, two thresholds $\epsilon 0$ and $\epsilon 1$ ($\epsilon 0 < \epsilon 1$), the replacement of pixel values is performed in three stages with the pixel value of the center pixel, the average of pixel values of the center pixel and a surrounding pixel, and the pixel value of the surrounding pixel. More specifically, a surrounding pixel with a absolute difference exceeding the threshold $\epsilon 1$ is weighted by 0, and its pixel value is replaced by that of the center pixel. A surrounding pixel with a absolute difference less than the threshold $\epsilon 1$ and exceeding the threshold $\epsilon 0$ is weighted by 0.5, and its pixel value is replaced by the average of pixel values of the center pixel and the surrounding pixel. A surrounding pixel with a absolute difference less than the threshold $\epsilon 0$ is weighted by 1, and its pixel value is left original without being replaced.

Figure 9:
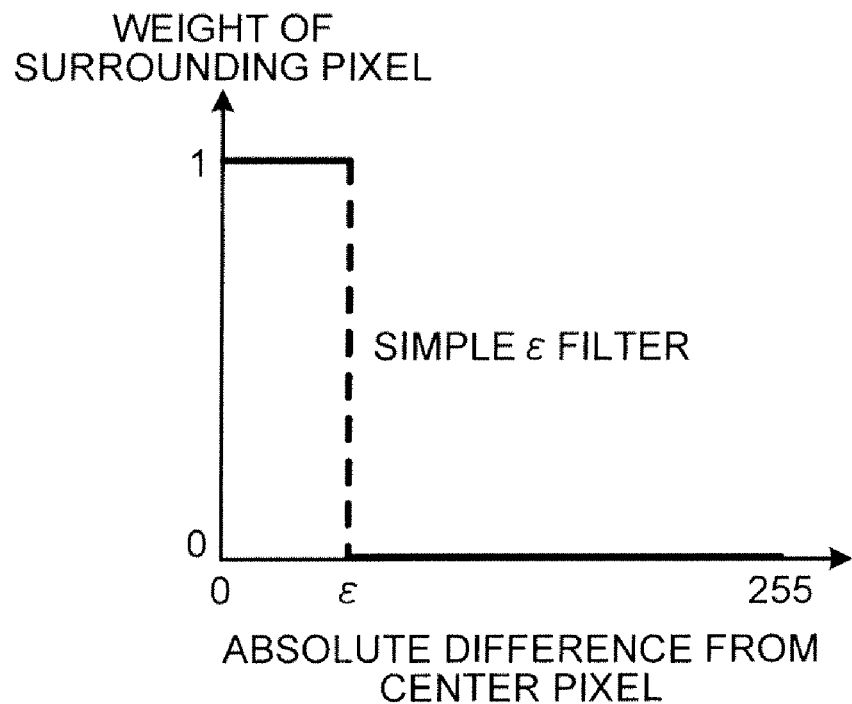
FIG. 9 is an exemplary schematic diagram for explaining the relationship between an absolute difference from a center pixel and the weight of a surrounding pixel in a simple $\epsilon$ filter and a bilateral filter in the embodiment.
Figure 9:
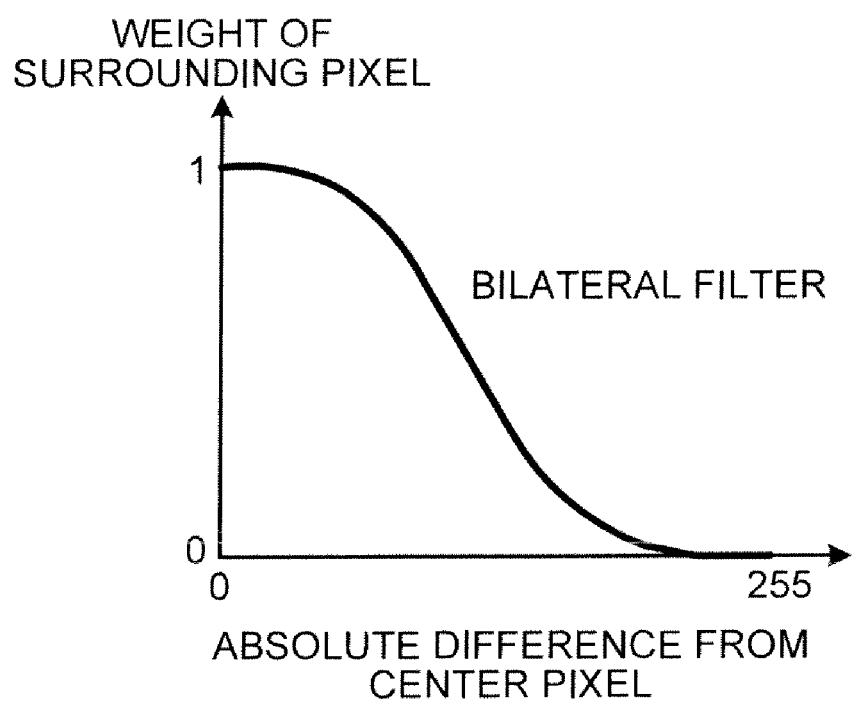

FIG. 9 illustrates an example of the relationship between an absolute difference from the center pixel and the weight of a surrounding pixel in a simple $\epsilon$ filter and a bilateral filter. As illustrated in FIG. 9, with a simple $\epsilon$ filter having one threshold, pixel value variation after filtering may not be smooth at a portion where pixel values vary largely such as at an edge. A bilateral filter assigns a higher weight to the pixel value of a surrounding pixel with a smaller absolute difference from that of the center pixel to be processed and convolutes the pixel value. With the bilateral filter, pixel value variation is smooth after filtering. However, the bilateral filter is not suitable for high-speed operation such as single instruction multiple data (SIMD) operation.

On the other hand, the multi $\epsilon$ filter 41 of the embodiment mixes the pixel value of the center pixel with the pixel values of surrounding pixels in stages using a plurality of thresholds $\epsilon$. With this, even at a portion where pixel values vary largely such as at an edge, pixel value variation after filtering can be smooth. In addition, the replacement using the thresholds $\epsilon$ and the calculation of the average can be performed at a high speed by the SIMD operation or the like.

Figure 10:
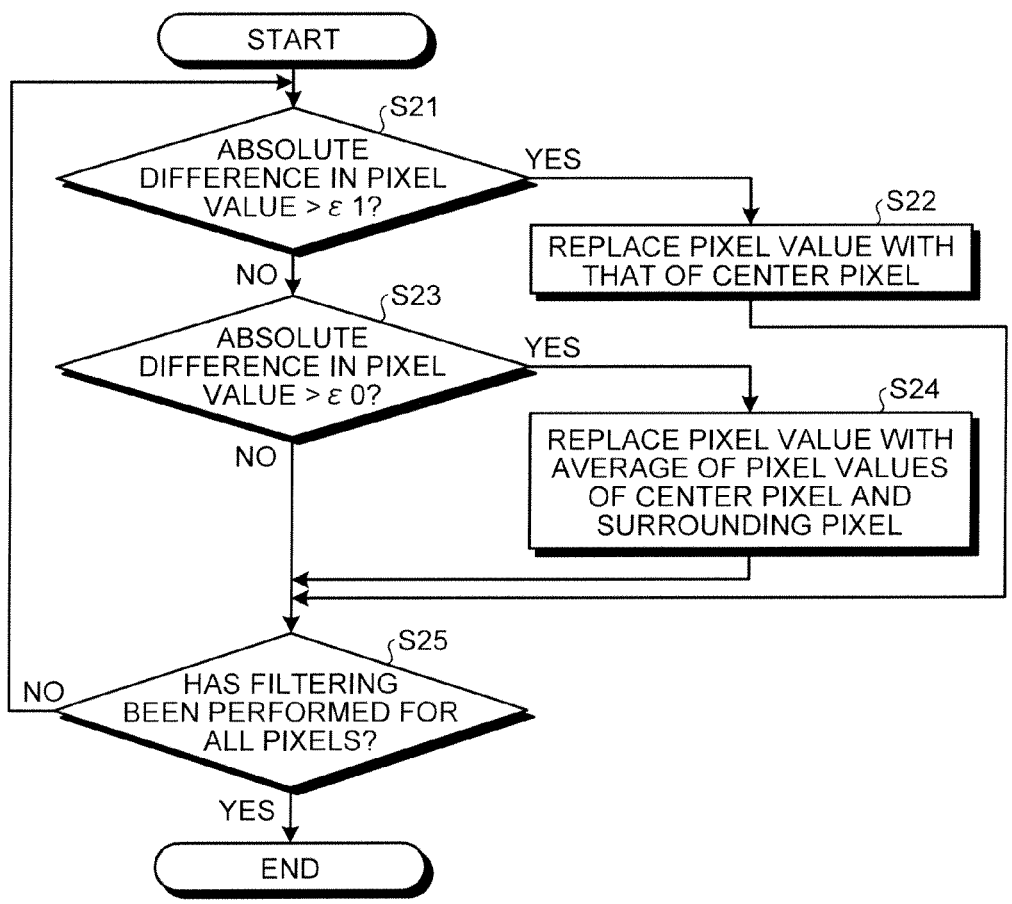
FIG. 10 is an exemplary flowchart of the operation of the multi $\epsilon$ filter in the embodiment.

FIG. 10 is a flowchart of the operation of the multi $\epsilon$ filter 41. More specifically, FIG. 10 illustrates the multi $\epsilon$ filtering using the two thresholds $\epsilon 0$ and $\epsilon 1$ ($\epsilon 0 < \epsilon 1$). As illustrated in FIG. 10, first, the multi $\epsilon$ filter 41 determines whether an absolute difference between the center pixel and a surrounding pixel exceeds the threshold $\epsilon 1$ in a pixel block corresponding to each pixel in an input image (S21). If the absolute difference exceeds the threshold $\epsilon 1$ (Yes at S21), the multi $\epsilon$ filter 41 replaces the pixel value of the surrounding pixel with that of the center pixel. Then, the process moves to S25.

On the other hand, if the absolute difference does not exceed the threshold $\epsilon 1$ (No at S21), the multi $\epsilon$ filter 41 determines whether the absolute difference between the center pixel and the surrounding pixel exceeds the threshold $\epsilon 0$ (S23). If the absolute difference exceeds the threshold $\epsilon 0$ (Yes at S23), the multi $\epsilon$ filter 41 replaces the pixel value of the surrounding pixel with the average of the pixel values of the center pixel and the surrounding pixel (S24). Then, the process moves to S25. On the other hand, if the absolute difference does not exceed the threshold $\epsilon 0$ (No at S23), the multi $\epsilon$ filter 41 leaves the pixel value of the surrounding pixel as original, and the process moves to S25.

The multi $\epsilon$ filter 41 determines whether the multi $\epsilon$ filtering has been performed for all pixel blocks corresponding to all pixels of the input image (S25). If the multi $\epsilon$ filtering has been performed for all the pixel blocks corresponding to all the pixels (Yes at S25), the process ends. If not (No at S25), the process returns to S21 to perform the multi $\epsilon$ filtering on a pixel block of a pixel on which the multi $\epsilon$ filtering is yet to be performed.

Figure 11:
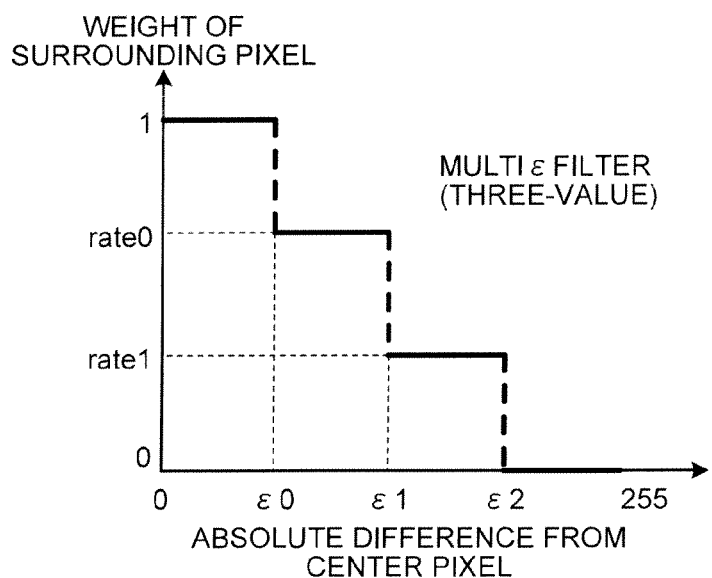
FIG. 11 is an exemplary schematic diagram for explaining the relationship between an absolute difference from a center pixel and the weight of a surrounding pixel in a multi $\epsilon$ filter (three-value) in the embodiment.

FIG. 11 illustrates an example of the relationship between an absolute difference from the center pixel and the weight of a surrounding pixel in a multi $\epsilon$ filter (three-value). As illustrated in FIG. 11, the multi $\epsilon$ filter may use not only two thresholds $\epsilon$ but also three or more thresholds $\epsilon$. In the case of three thresholds, the rate at which a surrounding pixel is weighted is set in stages such that the ratio of the pixel value of the center pixel increases as a absolute difference increases. More specifically, with respect to the thresholds $\epsilon 0:\epsilon 1:\epsilon 2=1:2:3$, the rate at which surrounding pixels are weighted is set in stages such that the weights of the surrounding pixels are at a rate of 3:2:1 according to the rate of each of the thresholds. This enables pixel value variation after filtering to be smoother.

As illustrated in FIG. 7, the coefficient filter 42 performs convolution operation with a filter coefficient output from the template table storage module 20 with respect to each pixel block (first pixel block) on which the multi $\epsilon$ filtering has been performed by the multi $\epsilon$ filter 41, thereby filtering each pixel. The filtering module 40 removes noise from an input image with this filtering. Since the multi $\epsilon$ filtering is performed by the multi $\epsilon$ filter 41 before the coefficient filter 42 performs the filtering, the filtering by the coefficient filter 42 is not affected by a surrounding pixel with a large difference from the center pixel in the pixel block. Thus, appropriate filtering can be performed.

The switches 43 and 44 switch a processing route for each pixel in an image filtered by the coefficient filter 42 based on the edge parameter indicating the direction, intensity, and sharpness of an edge calculated by the edge parameter calculator 30. More specifically, if the value of the edge parameter (for example, intensity, sharpness, or the like of an edge) is sufficiently small and smaller than a preset value and a pixel block to be filtered has a smooth image structure, the switches 43 and 44 switch the processing route so that the pixel block is processed by the large area $\epsilon$ filter 45 and the large area filter 46. On the other hand, if the value of the edge parameter exceeds the preset value and a pixel block to be filtered has an image structure of an edge or a corner, the switches 43 and 44 switch the processing route so that the pixel block is output as pixels of an output image without being processed by the large area $\epsilon$ filter 45 and the large area filter 46.

Figure 12:
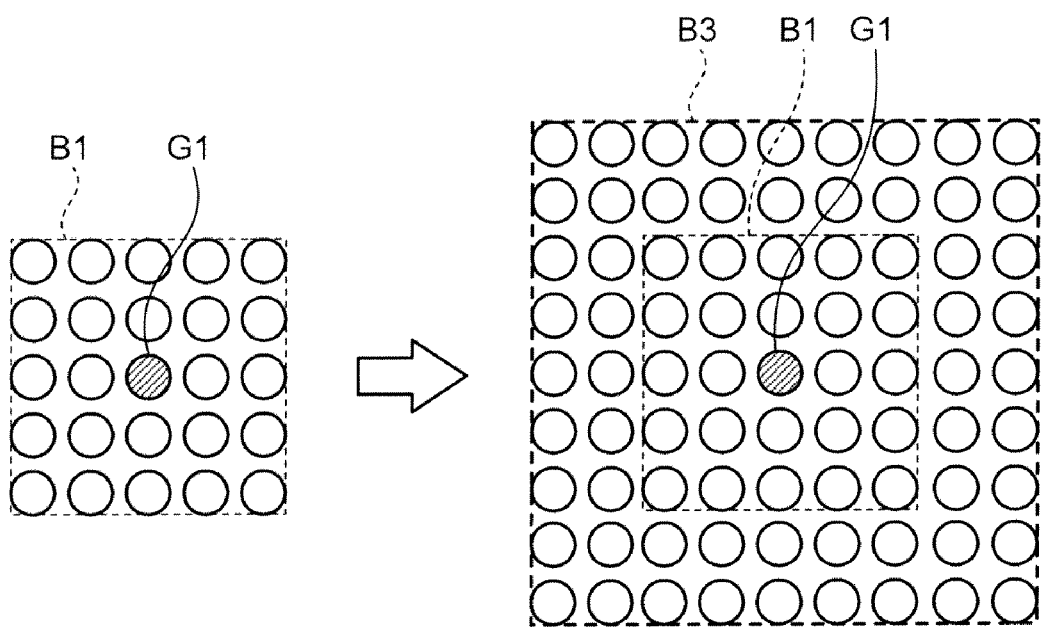
FIG. 12 is an exemplary schematic diagram of a third pixel block in large area filtering in the embodiment.

The large area $\epsilon$ filter 45 performs $\epsilon$ filtering on each pixel of a third pixel block (large area pixel block) larger than the first pixel block as a processing range (hereinafter, "large area $\epsilon$ filtering"). More specifically, in the large area $\epsilon$ filtering, with a pixel to be processed as a center pixel G1, a third pixel block B3 larger than the first pixel block B1 is set as a processing range as illustrated in FIG. 12. The large area filter 45 compares an absolute difference between the center pixel G1 and each surrounding pixel in the third pixel block B3 with the threshold $\epsilon$, and replaces the pixel value of a surrounding pixel with an absolute difference exceeding the threshold $\epsilon$ by that of the center pixel.

The large areas filtering may be the multi $\epsilon$ filtering. However, since the large area $\epsilon$ filter 45 performs the filtering on a pixel having a smooth image structure, the large area $\epsilon$ filtering is preferably simple $\epsilon$ filtering using one threshold $\epsilon$ for simplification of the processing. In view of this, the large area $\epsilon$ filtering of the embodiment may be simple $\epsilon$ filtering using one threshold C.

The large area filter 46 performs smoothing (large area filtering) using a mean filter on each pixel block (third pixel block) on which the large area $\epsilon$ filter 45 has performed the large area $\epsilon$ filtering. More specifically, the large area filter 46 averages pixel values of pixels in a pixel block.

With only the multi $\epsilon$ filter 41 and the coefficient filter 42 that remove noise from the first pixel block B1, an area having a smooth image structure may not be sufficiently smoothed. If the size of the first pixel block B1 is increased to handle this, it is necessary to increase the size of the template table stored in the template table storage module 20. This causes an increase in the required memory capacity of the template table storage module 20 and the operation amount of the coefficient filter 42 at the time of filtering.

Accordingly, in the embodiment, the switches 43 and 44 switch the processing route so that the large area $\epsilon$ filter 45 and the large area filter 46 process an area having a smooth image structure. With this, the large area filtering is performed on the third pixel block B3 larger than the first pixel block B1. Thus, more efficient filtering can be performed on an area having a smooth image structure, and image quality after the filtering can be increased. Besides, while the large area filtering is performed on pixels more than those of the first pixel block B1, the processing can be performed with the same or less operation amount than the amount of operation (multiplication related to convolution operation) of the coefficient filter 42 that increases in the case of filtering on the first pixel block B1 having an increased size.

If the first pixel block B1 has n pixels both vertically and horizontally from the center pixel and is in a size of $(2n+1)\times(2n+1)$ pixels, the third pixel block B3 may have 2n pixels both vertically and horizontally from the center pixel and be in a size of $(4n+1)\times(4n+1)$ pixels (n: a natural number not including 0).

Further, if the first pixel block 31 has n pixels both vertically and horizontally from the center pixel and is in a size of $(2n+1)\times(2n+1)$ pixels, the third pixel block 33 may be in a size of 8 m×8 m pixels (n, m: both natural numbers satisfying the relationship $2n+1<8$ m). When the first pixel block B1 and the third pixel block B3 satisfy such a relationship, a CPU, a DSP, and the like that handle data in multiples of 8 bits can efficiently perform the large area filtering on the third pixel block B3.

Figure 13:
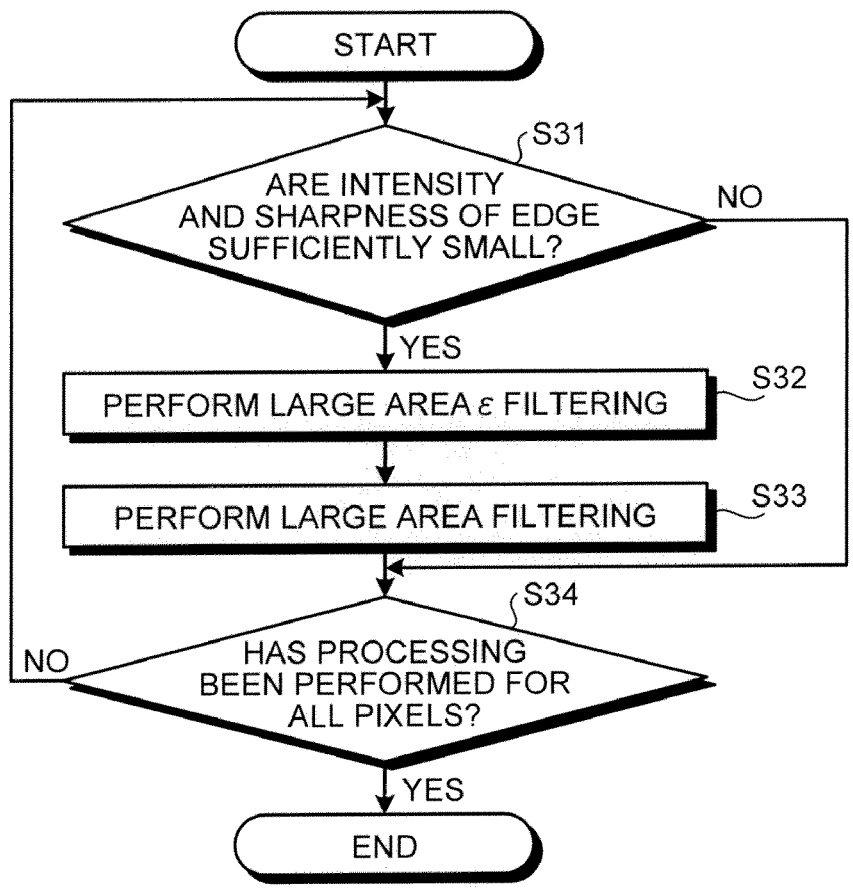
FIG. 13 is an exemplary flowchart of the operation of the filtering module related to the large area filtering in the embodiment.

FIG. 13 is a flowchart of the operation of the filtering module 40 related to the large area filtering. As illustrated in FIG. 13, when processing starts on a predetermined pixel in an image filtered by the coefficient filter 42, the switches 43 and 44 determine whether an edge parameter indicating the intensity, sharpness, or the like of an edge calculated by the edge parameter calculator 30 is sufficiently small and smaller than a preset value (S31).

When the intensity, sharpness, or the like of the edge is sufficiently small (Yes at S31), the large area $\epsilon$ filter 45 performs the large area $\epsilon$ filtering on the predetermined pixel (S32), and the large area filter 46 performs the large area filtering on the predetermined pixel). Then, the process moves to S34. On the other hand, when the intensity, sharpness, or the like of the edge is not sufficiently small (No at S31), the process moves to S34 without the large area $\epsilon$ filtering and the large area filtering on the predetermined pixel.

The filtering module 40 determines whether the processing has been performed for all pixels in the image filtered by the coefficient filter 42 (S34). If the processing has been performed for all the pixels (Yes at S34), the process ends. If not, the process returns to S31 to perform the processing on a predetermined pixel on which the processing is yet to be performed.

Figure 14:
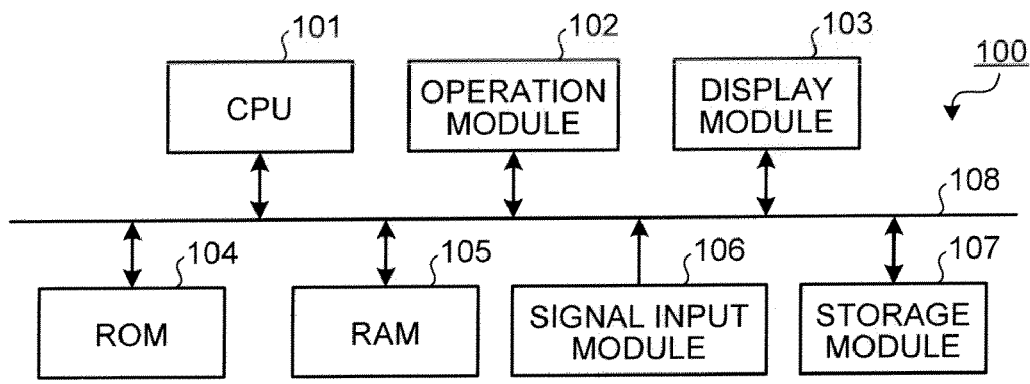
FIG. 14 is an exemplary functional block diagram of a hardware configuration of a computer in the embodiment.

FIG. 14 is a functional block diagram of a hardware configuration of a computer 100. As illustrated in FIG. 14, the computer 100 comprises a CPU 101, an operation module 102, a display module 103, a read only memory (ROM) 104, a random access memory (RAM) 105, a signal input module 106, and a storage module 107, which are connected by a bus 108.

The CPU 101 uses a predetermined area in the RAM 105 as a work area, and executes various computer programs stored in advance in the ROM 104 or the like to implement various types of processing. The CPU 101 controls the overall operation of the computer 100. Further, the CPU 101 executes a computer program stored in advance in the ROM 104 or the like to implement the image processing method of the embodiment.

The operation module 102 comprises various types of input keys. The operation module 102 receives information input by the user as an input signal and outputs it to the CPU 101.

The display module 103 comprises a display panel such as a liquid crystal display (LCD) panel or the like to display various types of information, an output image processed as described above, and the like based on a display signal from the CPU 101. The display module 103 may be integrated with the operation module 102 to form a touch panel.

The ROM 104 is a nonvolatile memory that stores various types of setting information, computer programs related to the control of the computer 100, and the like. The RAM 105 is a storage medium such as a synchronous dynamic random access memory (SDRAM). The RAM 105 provides the work area to the CPU 101 and functions as a buffer.

The signal input module 106 is an interface that receives electrical signals of a still image, video, sound, and the like, and outputs the signals to the CPU 101. The signal input module 106 may be a communication interface to a broadcast program receiver (tuner), the Internet, and the like.

The storage module 107 comprises a magnetic or optical recording medium. Under the control of the CPU 101, the storage module 107 stores data such as a still image, video, sound, and the like received through the signal input module 106.

Figure 15:
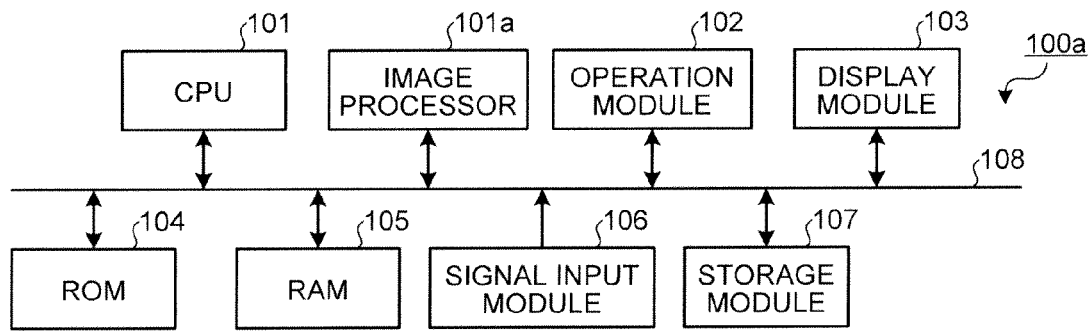
FIG. 15 is an exemplary functional block diagram of a hardware configuration of a computer in the embodiment.

FIG. 15 illustrates a hardware configuration of a computer 100a. As illustrated in FIG. 15, the computer 100a may be, for example, an image processing DSP, and comprises an image processor 101a that implements the image processing method of the embodiment. As described above, the image processing method of the embodiment may be implemented by the cooperation of the CPU 101 and a computer program (hereinafter, "image processing program"), and may also be implemented by a dedicated image processing DSP or the like. The computer 100 (100a) may be an information processor such as a personal computer (PC), a display device such as a television receiver, a recorder for recording a broadcast program received by a tuner, or the like.

The image processing program executed by the CPU 101 may be provided to the computer as being stored in the ROM or the like. The image processing program may also be provided to the computer as being stored in a computer-readable storage medium, such as a compact disc-read only memory (CD-ROM), a flexible disk (FD), a compact disc recordable (CD-R), and a digital versatile disc (DVD), as a file in an installable or executable format.

The image processing program may also be stored in a computer connected via a network such as the Internet so that it can be downloaded therefrom via the network. Further, the display processing program may also be provide or distributed via a network such as the Internet.

Figure 16:
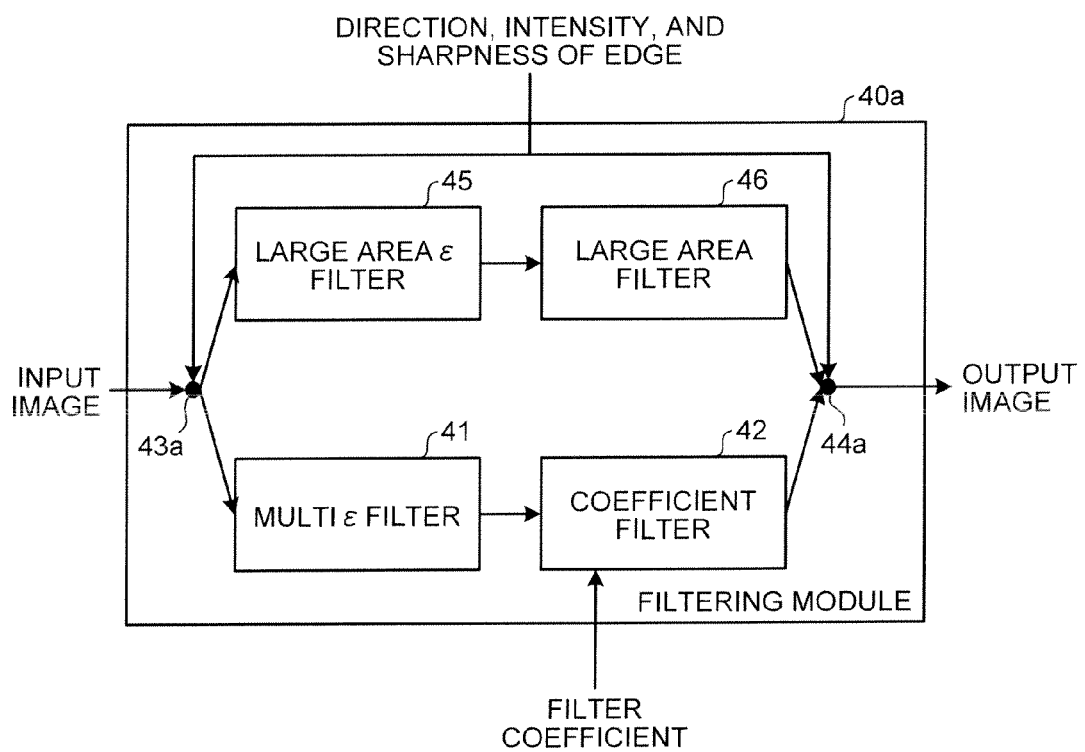
FIG. 16 is an exemplary functional block diagram of a filtering module according to a modification of the embodiment.

A description will be given of a modification of the filtering module 40. FIG. 16 is a functional block diagram of a filtering module 40a according to the modification. As illustrated in FIG. 16, the filtering module 40a is basically similar in configuration to the filtering module 40 except for the presence of switches 43a and 44a in place of the switches 43 and 44.

The switches 43a and 44a switch a processing route for each pixel in an input image based on an edge parameter indicating the direction, intensity, and sharpness of an edge calculated by the edge parameter calculator 30. More specifically, if the value of the edge parameter (for example, intensity, sharpness, or the like of an edge) is sufficiently small and smaller than a preset value and a pixel block to be filtered has a smooth image structure, the switches 43a and 44a switch the processing route so that the pixel block is processed by the large area ε filter 45 and the large area filter 46. On the other hand, if the value of the edge parameter exceeds the preset value and a pixel block to be filtered has an image structure of an edge or a corner, the switches 43a and 44a switch the processing route so that the pixel block is processed by the multi ε filter 41 and the coefficient filter 42.

In an area of an input image having a smooth image structure, noise removal effect may be small and the large area filtering may suffice for noise removal. In such a case, the filtering module 40a switches the processing route to perform efficient filtering without performing less efficient filtering. Moreover, the switching of the processing route enables an appropriate ε filter to be selected. More specifically, the large area ε filtering using one threshold ε suitable for efficient filtering is selected for an area having a smooth image structure, while the multi ε filtering suitable for the coefficient filter 42 to perform appropriate filtering is selected for an area having an image structure of an edge or a corner.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a storage module configured to store a filter coefficient corresponding to a first orientation histogram related to pixel gradient in a first pixel block of a predetermined size comprising a plurality of pixels;
    a calculator configured to calculate a second orientation histogram related to pixel gradient in a second pixel block comprising a specific pixel to be processed and pixels surrounding the specific pixel in an input image, the second pixel block being larger than the first pixel block;
    a converter configured to convert the second orientation histogram to the first orientation histogram corresponding to the first pixel block with the specific pixel to be processed at a center; and
    a filter configured to perform filtering on the first pixel block with the specific pixel to be processed at the center using the filter coefficient corresponding to the first orientation histogram.

2. The image processing apparatus of claim 1, wherein
    the first pixel block comprises (2n+1)×(2n+1) pixels,
    the second pixel block comprises (4n+1)×(4n+1) pixels, and
    n is a natural number not including 0.

3. The image processing apparatus of claim 1, wherein
    the first pixel block comprises (2n+1)×(2n+1) pixels,
    the second pixel block comprises 8 m×8 m pixels, and
    n and m are natural numbers satisfying relationship 2n+1<8 m.

4. The image processing apparatus of claim 1, wherein the converter is configured to convert the second orientation histogram to the first orientation histogram based on a ratio of areas between the first pixel block and the second pixel block.

5. The image processing apparatus of claim 1, wherein
the filter coefficient stored in the storage module corresponds to a regression curve fitted to the first pixel block indicated by the first orientation histogram in the first pixel block, and
the filter is configured to perform the filtering equivalent to regression curve fitting using the filter coefficient corresponding to the regression curve indicated by the first orientation histogram.

6. A display device comprising:
a storage module configured to store a filter coefficient corresponding to a first orientation histogram related to pixel gradient in a first pixel block of a predetermined size comprising a plurality of pixels;
a calculator configured to calculate a second orientation histogram related to pixel gradient in a second pixel block comprising a specific pixel to be processed and pixels surrounding the specific pixel in an input image, the second pixel block being larger than the first pixel block;
a converter configured to convert the second orientation histogram to the first orientation histogram corresponding to the first pixel block with the specific pixel to be processed at a center;
a filter configured to perform filtering on the first pixel block with the specific pixel to be processed at the center using the filter coefficient corresponding to the first orientation histogram and output an output image obtained by filtering the input image; and
a display module configured to display the output image.

7. An information processing method applied to an image processing apparatus comprising a storage module configured to store a filter coefficient corresponding to a first orientation histogram related to pixel gradient in a first pixel block of a predetermined size comprising a plurality of pixels, the information processing method comprising:
a calculator calculating a second orientation histogram related to pixel gradient in a second pixel block comprising a specific pixel to be processed and pixels surrounding the specific pixel in an input image, the second pixel block being larger than the first pixel block;
a converter converting the second orientation histogram to the first orientation histogram corresponding to the first pixel block with the specific pixel to be processed at a center; and
a filter performing filtering on the first pixel block with the specific pixel to be processed at the center using the filter coefficient corresponding to the first orientation histogram.

* * * * *